(12) United States Patent
Hori et al.

(10) Patent No.: US 10,655,514 B2
(45) Date of Patent: May 19, 2020

(54) MECHANICAL DEVICE

(71) Applicant: Komatsu Ltd., Tokyo (JP)

(72) Inventors: Shuuji Hori, Tokyo (JP); Hiroyuki Chikugo, Tokyo (JP); Mutsumi Ono, Tokyo (JP); Takuya Nohara, Tokyo (JP); Yuta Baba, Tokyo (JP); Toshiyuki Matsumoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/757,486

(22) PCT Filed: Oct. 28, 2016

(86) PCT No.: PCT/JP2016/082079
§ 371 (c)(1),
(2) Date: Mar. 5, 2018

(87) PCT Pub. No.: WO2017/073734
PCT Pub. Date: May 4, 2017

(65) Prior Publication Data
US 2018/0245490 A1 Aug. 30, 2018

(30) Foreign Application Priority Data

Oct. 30, 2015 (WO) .................. PCT/JP2015/080858

(51) Int. Cl.
*F01M 11/10* (2006.01)
*F04B 53/18* (2006.01)
(Continued)

(52) U.S. Cl.
CPC ........... *F01M 11/10* (2013.01); *B01D 29/114* (2013.01); *B01D 29/15* (2013.01); *B01D 35/005* (2013.01);
(Continued)

(58) Field of Classification Search
CPC .. F01M 11/10; F01M 11/0408; F16K 5/0407; F16K 5/0478; G01M 11/00; A61B 1/00
See application file for complete search history.

(56) References Cited

U.S. PATENT DOCUMENTS 4,414,951 A * 11/1983 Saneto ................. F02M 27/045
123/536
5,104,294 A    4/1992 Banba
(Continued)

FOREIGN PATENT DOCUMENTS

CN         2082881 U      8/1991
CN       202833355 U      3/2013
(Continued)

OTHER PUBLICATIONS

International Search Report dated Jan. 26, 2016, issued for PCT/JP2015/080858.
(Continued)

*Primary Examiner* — Tracy Y. Li
(74) *Attorney, Agent, or Firm* — Locke Lord LLP

(57) ABSTRACT

In order to be able to easily check the state of foreign matter contained in oil regardless of an installation location, a device main body 10 having a housing chamber 11 in which oil is stored, a plug 20 attached to a bottom portion of the housing chamber 11 in a state where an end surface of a shaft portion 20a faces upward, a spacer member 30 formed by a transparent member and arranged on the plug 20 in such a manner that one end surface 30a faces an inside of the housing chamber 11; and an imaging unit 40 arranged on the plug 20, the imaging unit 40 imaging the inside of the housing chamber 11 via the spacer member 30 are provided.

13 Claims, 7 Drawing Sheets

(51) Int. Cl.
*F15B 21/04* (2019.01)
*F04B 53/16* (2006.01)
*B01D 35/02* (2006.01)
*B01D 29/15* (2006.01)
*B01D 35/16* (2006.01)
*F15B 1/26* (2006.01)
*B01D 29/11* (2006.01)
*B01D 35/00* (2006.01)
*F15B 21/041* (2019.01)
*H04N 5/225* (2006.01)
*F01M 1/02* (2006.01)
*F01M 11/00* (2006.01)

(52) U.S. Cl.
CPC ............ *B01D 35/02* (2013.01); *B01D 35/16* (2013.01); *F04B 53/16* (2013.01); *F04B 53/18* (2013.01); *F15B 1/26* (2013.01); *F15B 21/04* (2013.01); *F15B 21/041* (2013.01); *H04N 5/2253* (2013.01); *F01M 1/02* (2013.01); *F01M 11/0004* (2013.01); *F15B 2211/615* (2013.01); *F15B 2211/655* (2013.01); *H04N 2005/2255* (2013.01)

(56) References Cited

U.S. PATENT DOCUMENTS

| | | | |
|---|---|---|---|
| 7,171,982 B2 | 2/2007 | Dudra | |
| 9,371,827 B2 | 6/2016 | Lefebvre et al. | |
| 10,174,829 B2 | 1/2019 | Abe et al. | |
| 2002/0162407 A1* | 11/2002 | Nightlinger | F01M 11/0408 74/1.5 |
| 2004/0028544 A1 | 2/2004 | Schmitt et al. | |
| 2005/0104025 A1* | 5/2005 | Grua | F16K 5/0407 251/309 |
| 2006/0003345 A1 | 1/2006 | Brees et al. | |
| 2012/0242982 A1* | 9/2012 | Ikeda | G01J 3/02 356/213 |
| 2012/0269658 A1 | 10/2012 | Lefebvre et al. | |

FOREIGN PATENT DOCUMENTS

| | | | |
|---|---|---|---|
| CN | 202867364 U | | 4/2013 |
| CN | 105074284 A | | 11/2015 |
| DE | 102004048822 A1 | | 4/2006 |
| EP | 2444668 A1 | | 4/2012 |
| JP | 58-156356 A | | 9/1983 |
| JP | 61-019416 U | | 2/1986 |
| JP | 06-066372 A | | 3/1994 |
| JP | 2006-283901 A | | 10/2006 |
| JP | 2012-072725 A | | 4/2012 |
| TW | 2004-386728 | * | 4/2003 |

OTHER PUBLICATIONS

International Search Report dated Jan. 24, 2017, issued for PCT/JP2016/082079.

* cited by examiner

MECHANICAL DEVICE

FIELD

The present invention relates to a mechanical device such as a hydraulic device.

BACKGROUND

Oil is stored inside a device main body of a hydraulic pump that supplies oil to a hydraulic actuator such as a hydraulic cylinder. Oil lubricates and cools a rotation supporting portion such as a bearing and a sliding portion of mechanical parts. In addition, a filter element is housed inside the device main body of an oil filter arranged in a hydraulic circuit. The filter element filters and then feeds the oil stored inside. In the above-described hydraulic pump, foreign matter such as abrasion powder generated at the rotation supporting portion and the sliding portion may be mixed in the oil. Foreign matter mixed in the oil may cause problems such as uneven wear and damage on the rotation supporting portion and the sliding portion. Further, in the oil filter, there is a possibility that foreign matter mixed in while passing through the hydraulic circuit may clog the filter. Therefore, in this type of hydraulic device, how to easily check the state of oil from the outside of the device main body is an important subject. A conventional hydraulic device is also provided with a window hole formed in the device main body and a lens attached to the window hole (see, for example, Patent Literature 1).

CITATION LIST

Patent Literature

Patent Literature 1: Japanese Unexamined Utility Model Application Publication No. S61-19416 A

SUMMARY

Technical Problem

According to the oil filter described above, it is possible to visually recognize the contamination state of the filter element from the outside of the device main body via a lens. However, depending on the installation location of the oil filter, it is often difficult to visually inspect the interior of the device main body. For example, under a circumstance where an oil filter is installed inside an engine compartment, it is often difficult to bring a face close to a lens, and it is also difficult to check the condition of a filter element.

An aspect of the present invention is to provide a mechanical device that can easily check the state of foreign matter contained in oil regardless of installation location.

Solution to Problem

According to an aspect of the present invention, a mechanical device comprises: a device main body having a housing chamber in which oil is stored, a plug attached to a bottom portion of the housing chamber in a state where an end surface of a shaft portion faces upward, a spacer member formed by a transparent member and arranged on the plug in such a manner that one end surface faces an inside of the housing chamber; and an image sensor arranged on the plug, the image sensor imaging the inside of the housing chamber via the spacer member.

In an aspect of the present invention, the other end surface of the spacer member can be disposed inside the plug.

In an aspect of the present invention, the one end surface of the spacer member can be disposed inside the plug.

In an aspect of the present invention, the image sensor can be supported by the plug.

In an aspect of the present invention, the mechanical device can comprise a recessed portion formed in the plug, wherein an inner bottom surface of the recessed portion can include the one end surface of the spacer member.

In an aspect of the present invention, the recessed portion can be tapered such that an inner diameter gradually increases as the recessed portion separates from the one end surface of the spacer member.

In an aspect of the present invention, the mechanical device can comprise a magnet body arranged on an inner peripheral surface of the recessed portion excluding the one end surface of the spacer member.

In an aspect of the present invention, the mechanical device can comprise a magnet body arranged on the one end surface of the spacer member.

In an aspect of the present invention, the plug can have a pressure receiving surface that supports hydraulic pressure applied via the spacer member.

In an aspect of the present invention, the device main body can include an engine provided in a construction machine, and the housing chamber can store oil falling from a component of the engine.

In an aspect of the present invention, the mechanical device can comprise a suction member having a suction port that sucks the oil of the housing chamber, wherein the suction port and the one end surface of the spacer member can be disposed at different positions in a horizontal plane.

In an aspect of the present invention, the one end surface of the spacer member can be disposed at a lowermost portion of the bottom portion.

In an aspect of the present invention, the mechanical device can comprise a discharge hole that discharges oil stored in the housing chamber to an outside, the discharge hole being provided at the bottom portion of the housing chamber, wherein the plug can be detachably attached to the discharge hole.

Advantageous Effects of Invention

According to the aspect of the present invention, it is possible to acquire a state inside the device main body as image data by an image sensor. Therefore, irrespective of the installation location of a mechanical device, it is possible to easily check the state of foreign matter contained in the oil.

DESCRIPTION OF EMBODIMENTS

Hereinafter, preferred embodiments of a hydraulic device according to the present invention will be described in detail with reference to the accompanying drawings.

First Embodiment

Figure 1:
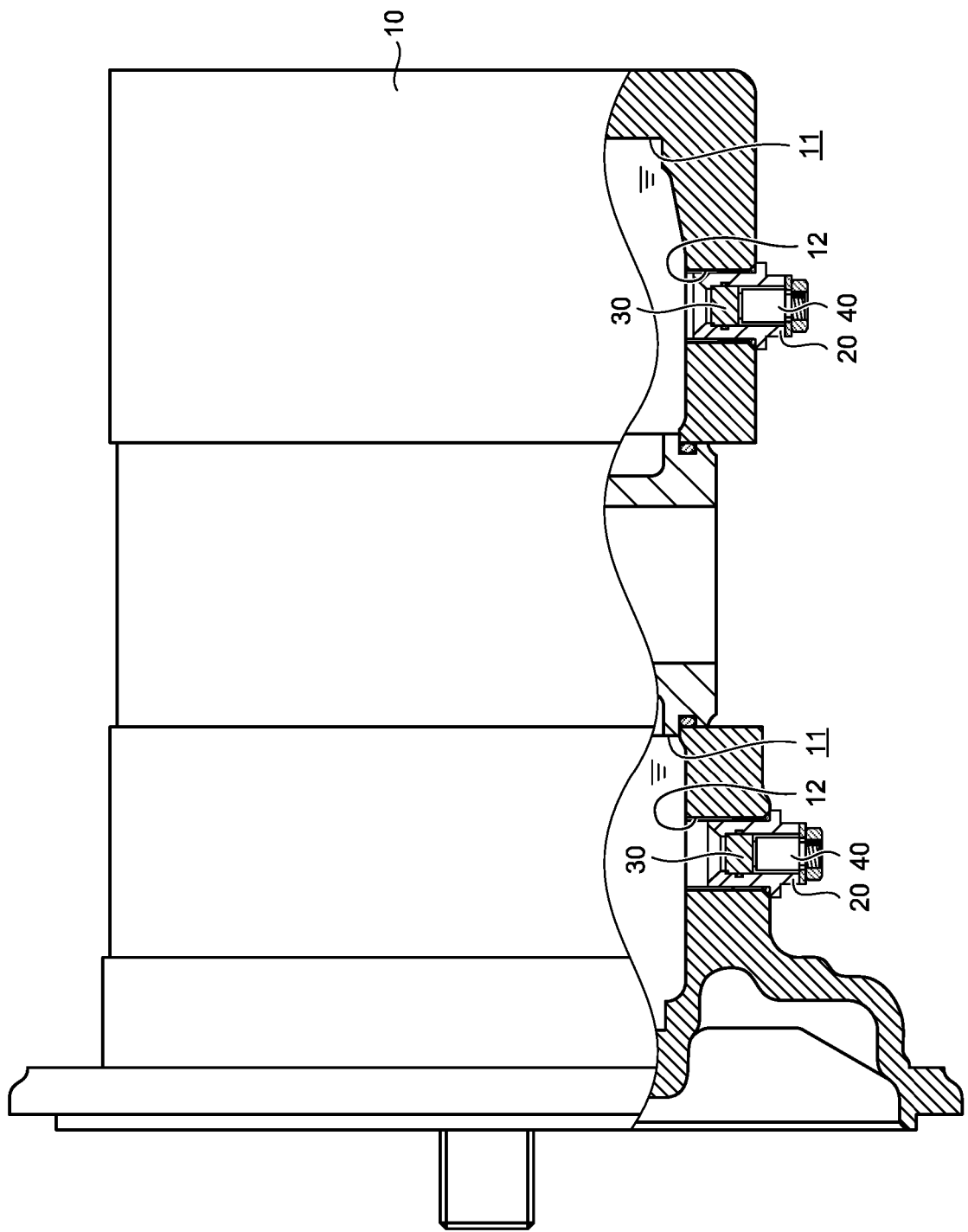
FIG. 1 is a partially cutaway view illustrating a hydraulic device according to a first embodiment of the present invention.

FIG. 1 illustrates a mechanical device according to a first embodiment of the present invention. In the first embodiment, an example in which the mechanical device includes a hydraulic device will be described. Although the hydraulic device exemplified here is not explicitly illustrated in the drawing, the hydraulic device is a hydraulic pump for supplying oil to a hydraulic actuator such as a hydraulic cylinder mounted on a construction machine. This hydraulic pump includes two independent housing chambers 11 inside a device main body 10. Components for discharging oil to the hydraulic actuator (not illustrated) are housed in the respective housing chambers 11. For example, a shaft member such as an output shaft is rotatably supported via a bearing, and an end surface of a rotating part such as a cylinder block is slidably supported by a valve plate. Discharge holes 12 each having a female screw on the inner peripheral surface are provided in a portion to be a bottom portion of each housing chamber 11 in the device main body 10, and plugs 20 are attached to each of the discharge holes 12. The plug 20 is detachably attached to the discharge hole 12. The discharge hole 12 is an opening for discharging the oil stored in the housing chamber 11 to the outside, and is provided at a position at the lowest position in a state where the hydraulic device is installed.

Figure 2:
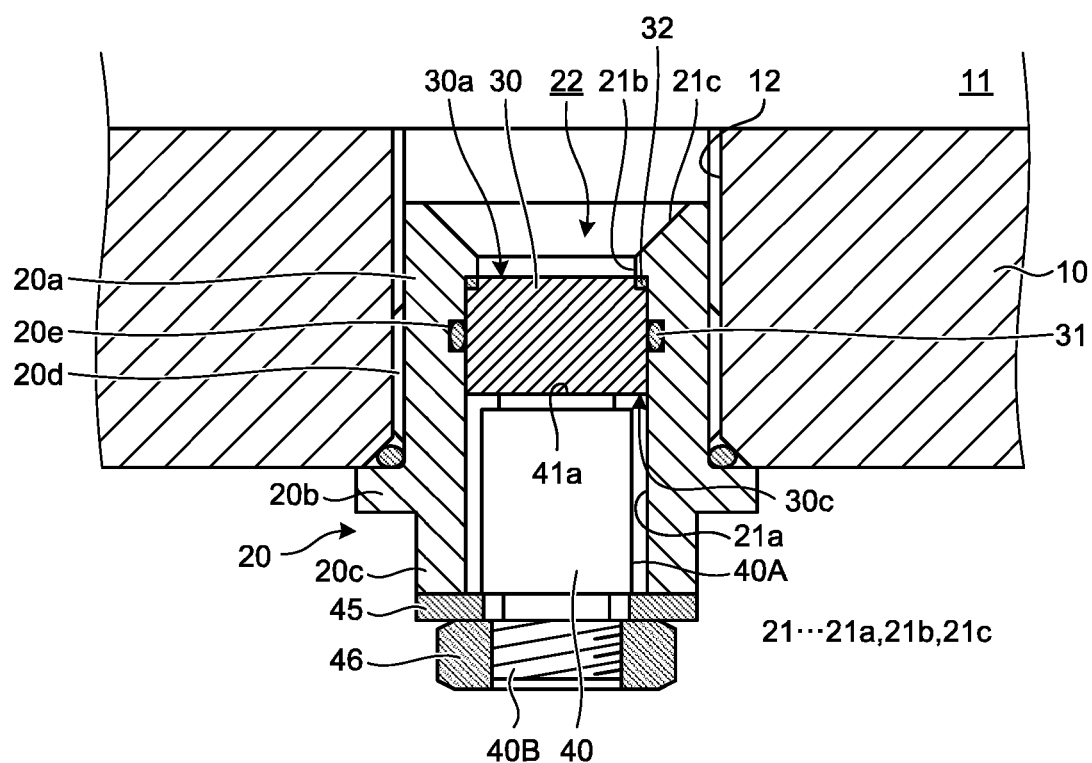
FIG. 2 is an enlarged cross-sectional view illustrating a main part of the hydraulic device illustrated in FIG. 1.

As illustrated in FIG. 2, the plug 20 is a metal member in which a shaft portion 20a, a flange portion 20b, and a head portion 20c are sequentially provided from a tip end side. The shaft portion 20a has a male screw 20d on an outer peripheral surface and is a portion to be screwed into the discharge hole 12 of the device main body 10. The flange portion 20b is an annular portion having an outer diameter larger than an inner diameter of the discharge hole 12. The head portion 20c is a portion to which a tool is fitted when attaching and detaching the plug 20, and has a polygonal column shape such as a quadrangular or hexagonal cross section. The plug 20 is attached to the bottom portion of the housing chamber 11 in a state where an end surface of the shaft portion 20a faces upward.

The plug 20 is provided with an attachment hole 21 at a portion extending from a base end surface of the head portion 20c to a tip end surface of the shaft portion 20a. The attachment hole 21 includes a housing hole portion 21a opened in the base end surface of the head portion 20c, a small diameter hole portion 21b having an inner diameter smaller than that of the housing hole portion 21a, and a tapered hole portion 21c formed so that an inner diameter gradually increases from the small diameter hole portion 21b toward a tip end surface, and houses a spacer member 30 and an imaging unit 40 in the housing hole portion 21a.

The spacer member 30 is molded with a transparent member. Each of the spacer members 30 is a transparent cylindrical member having an outer diameter that can be fitted into the housing hole portion 21a, and housed in the housing hole portion 21a of the plug 20 in a state where the axes of the spacer members 30 are aligned with each other and the small diameter hole portion 21b is in contact with one end surface 30a. The spacer member 30 made of glass or one made of resin may be applied. The one end surface 30a of the spacer member 30 is disposed inside the plug 20. The other end surface 30c of the spacer member 30 is also disposed inside the plug 20.

Figure 3:
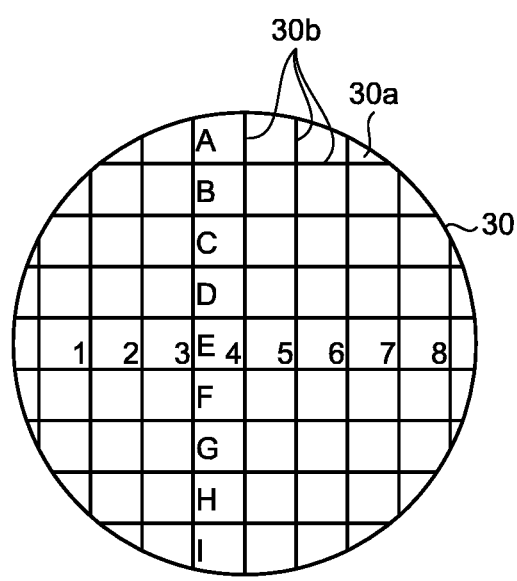
FIG. 3 is an enlarged conceptual view illustrating an end surface of a spacer member applied to a plug of the hydraulic device illustrated in FIG. 1.

As is clear from FIG. 2, in the plug 20 housing the spacer member 30 in the housing hole portion 21a, the one end surface 30a of the spacer member 30 is defined as an inner bottom surface by the tapered hole portion 21c provided at a base end portion and the spacer member 30, and a recessed portion 22 having a shape in which an inner diameter gradually increases toward the opening is formed. That is, the recessed portion 22 is tapered such that an inner diameter gradually increases as the recessed portion 22 separates from the one end surface 30a of the spacer member 30. An O-ring 31 arranged in a seal groove 20e of the plug 20 is brought into pressure contact with each other between an outer peripheral surface of the spacer member 30 and an inner peripheral surface of the housing hole portion 21a of the plug 20. In the spacer member 30 of the first embodiment, a magnet body 32 is arranged on an outer peripheral edge portion of a surface opposing the small diameter hole portion 21b, and as illustrated in FIG. 3, a scale mark 30b is marked on the one end surface 30a facing the housing chamber 11. The magnet body 32 is arranged on an outer peripheral edge portion of the one end surface 30a of the spacer member 30. The magnet body 32 is a permanent magnet formed in an annular shape. The scale mark 30b is provided in a square shape in the vertical and horizontal directions in actual dimensions.

Figure 4:
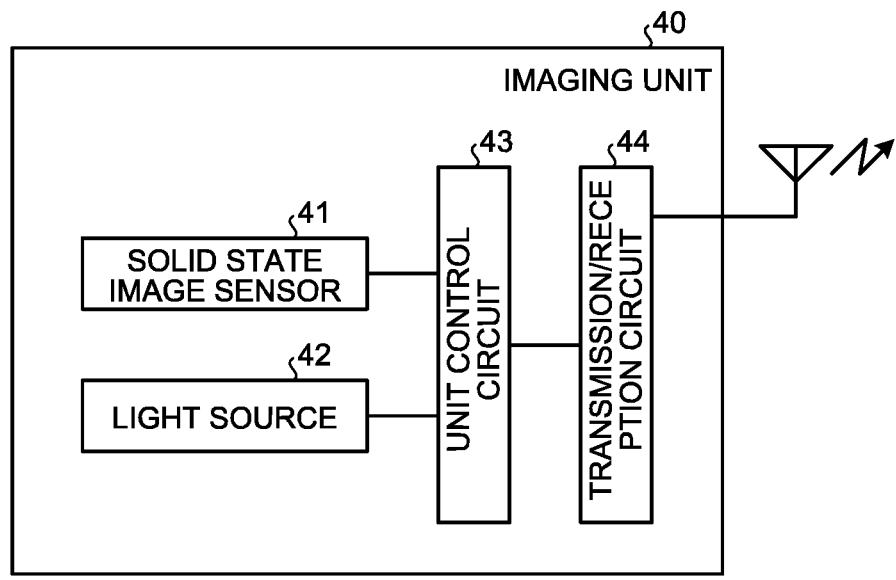
FIG. 4 is a block diagram illustrating a configuration example of an imaging unit applied to the plug of the hydraulic device illustrated in FIG. 1.

When an imaging instruction is given from an external device (not illustrated), the imaging unit 40 acquires image data with the one end surface 30a of the spacer member 30 as an imaging range, and outputs the acquired image data to the external device (not illustrated). The imaging unit 40 is applied in the first embodiment, as illustrated in FIG. 4, the imaging unit 40 including a solid state image sensor 41 such as CCD or CMOS, a light source 42 such as an LED that applies light from the periphery of the solid state image sensor 41 to an imaging range of the solid state image sensor 41, a unit control circuit 43 that controls driving of the solid state image sensor 41 and the light source 42, and a transmission/reception circuit 44 that transmits and receives data to and from an external device (not illustrated), in which as illustrated in FIG. 2, in a state where an imaging surface 41a of the solid state image sensor 41 is exposed to an outside, the imaging unit 40 is constructed by housing these components in a cylindrical unit case 40A. On a base end portion of the unit case 40A, a male screw portion 40B is provided.

The solid state image sensor 41 is arranged in the plug 20. The imaging unit 40 houses the imaging surface 41a of the solid state image sensor 41 in the housing hole portion 21a of the plug 20 in a state of being bonded to the other end surface 30c of the spacer member 30, and is supported by the plug 20 by screwing a nut 46 to the male screw portion 40B via a washer member 45. The solid state image sensor 41 of the imaging unit 40 is adjusted in advance so that the one end surface 30a of the spacer member 30 is in a focal position when the imaging surface 41a is brought into contact with the other end surface 30c of the spacer member 30. The solid state image sensor 41 captures an image of the interior of the housing chamber 11 via the spacer member 30. The image data acquired by the solid state image sensor 41 is preferably still image data, but it may be moving image data.

In the hydraulic pump constructed as described above, since the O-ring 31 is provided between the outer peripheral surface of the spacer member 30 and the inner peripheral surface of the housing hole portion 21a of the plug 20, there is no possibility that the oil stored in the housing chamber 11 leaks to the outside through these gaps. When the plug 20 is removed from the discharge hole 12, it is possible to discharge the oil stored in the housing chamber 11 to the outside.

On the other hand, when an imaging signal is given from an external device (not illustrated) to the unit control circuit 43 in a state where the plug 20 is screwed into the discharge hole 12, the solid state image sensor 41 acquires image data in which the one end surface 30a of the spacer member 30 is set as the imaging range in a state where the light source 42 is turned on, and the acquired image data is transferred to the external device (not illustrated).

Here, the spacer member 30 is arranged on the plug 20 in such a manner that the one end surface 30a faces the inside of the housing chamber 11. The one end surface 30a of the spacer member 30 arranged in the plug 20 faces upward in the lowest part of the housing chamber 11 and is in a state of being in contact with stored oil. Therefore, when foreign matter such as abrasion powder is mixed in the oil, the foreign matter gradually precipitates due to the difference in specific gravity while the hydraulic pump is stopped, and is deposited on the one end surface 30a of the spacer member 30; therefore, the foreign matter is displayed on the image data acquired by the solid state image sensor 41. In particular, in the above-described plug 20, since the magnet body 32 is provided at one end portion of the spacer member 30, it is possible to maintain the state of adsorption of foreign matter made of a magnetic material such as iron powder, and the state of contamination of foreign matter is more clearly displayed.

That is, in the above-described hydraulic pump, if image data is acquired before starting, for example, by analyzing the acquired image data without directly visually checking the inside of the device main body 10, it is possible to accurately check the state of the oil stored in the device main body 10, so that it is possible to take measures such as accurately determining the replacement time from the contamination state of the oil. Further, since the scale mark 30b is marked on the spacer member 30, it is also possible to recognize the size of foreign matter contained in the oil from the acquired image data. Further, since the image data is acquired by the solid state image sensor 41 provided in the plug 20, there is no need for an examiner to approve or look into the hydraulic pump every time; therefore, it is possible to easily check the state of oil regardless of the installation location of the hydraulic pump.

Figure 5:
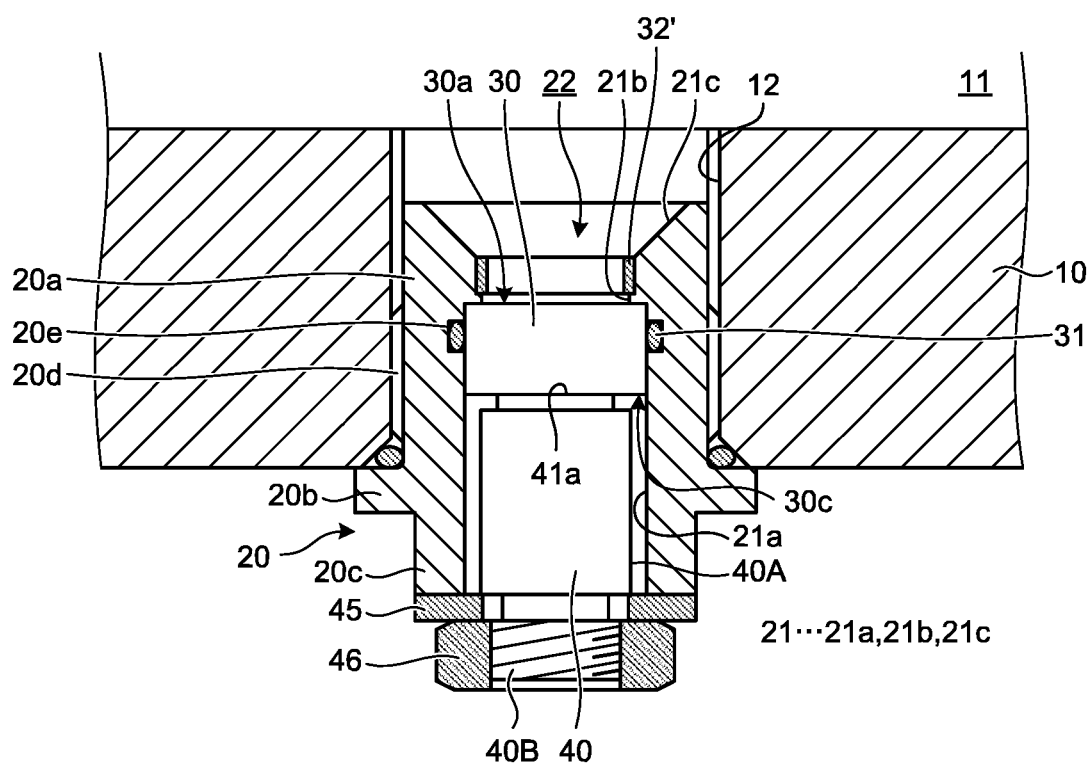
FIG. 5 is a cross-sectional view illustrating a modification of the plug to be attached to the hydraulic device illustrated in FIG. 1.

In the first embodiment described above, since the magnet body 32 is provided at one end portion of the spacer member 30, by keeping foreign matter made of a magnetic material in a state of being adsorbed, it is possible to reliably recognize this foreign matter by image data. However, it is not absolutely necessary to provide the magnet body 32. Further, in the case of providing the magnet body 32, it is not always necessary to be one end portion of the spacer member 30. For example, the magnet body 32 may be arranged on the inner peripheral surface of the recessed portion 22 except for the one end surface 30a of the spacer member 30. For example, as in a modification illustrated in FIG. 5, if the magnet body 32' is provided only on the inner peripheral surface of the small diameter hole portion 21b provided in the plug 20, it is possible to recognize that the foreign matter precipitated on the one end surface 30a of the spacer member 30 is not a magnetic material and it is thus possible to confirm the state of the oil more specifically. In the modification of FIG. 5, the same reference numerals are given to the same configurations as those of the first embodiment.

In the above-described first embodiment, a hydraulic pump having a movable portion such as a cylinder block in the housing chamber 11 of the device main body 10 is exemplified as a hydraulic device, but the present invention is not necessarily limited to a hydraulic pump. For example, the present invention can be applied to a hydraulic motor having a similar configuration, and furthermore, as in a second embodiment illustrated in FIG. 6, the present invention may be applied to an oil filter which does not have a movable portion in the housing chamber of the device main body.

Second Embodiment

Figure 6:
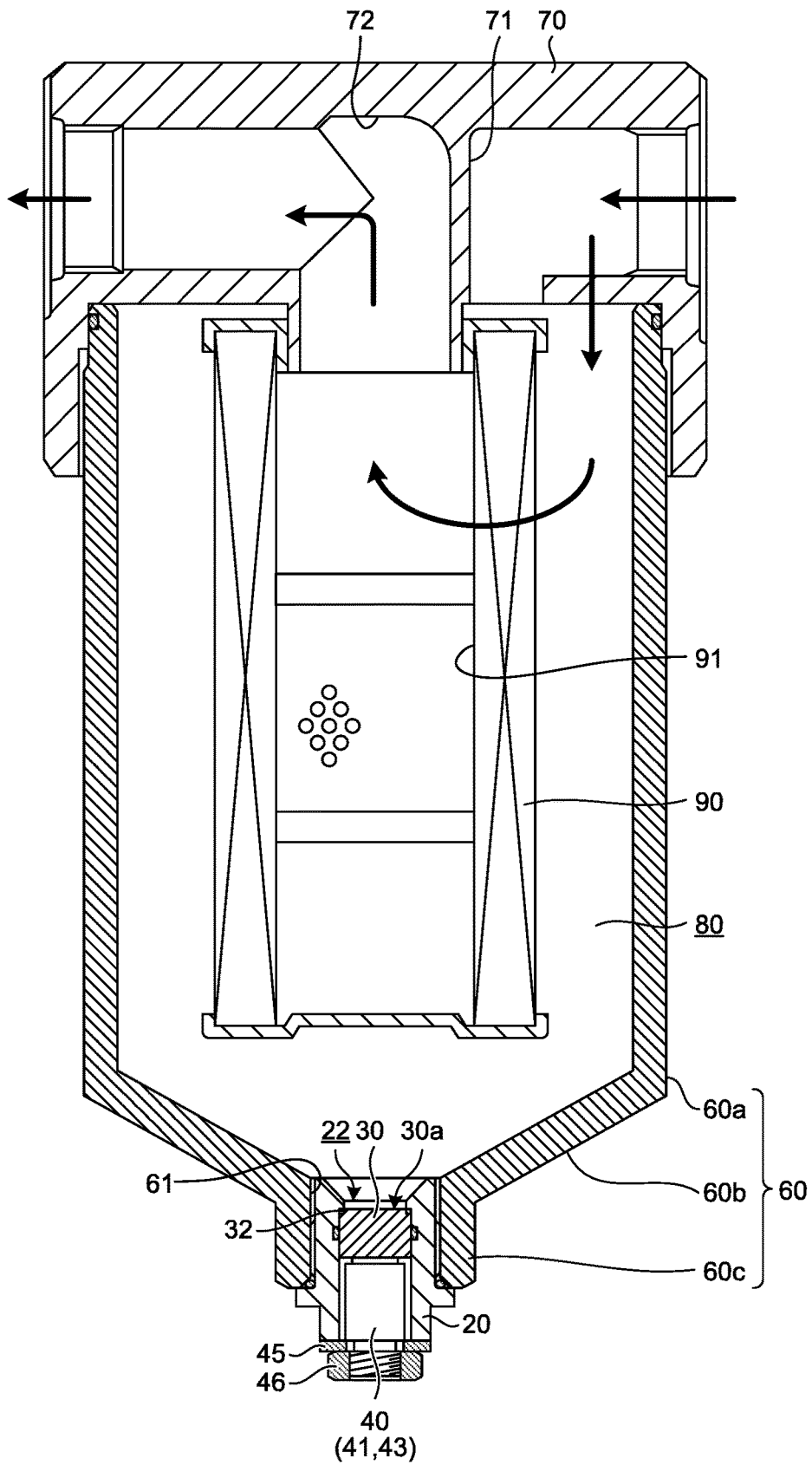
FIG. 6 is a cross-sectional view illustrating a hydraulic device according to a second embodiment of the present invention.

FIG. 6 illustrates the internal structure of an oil filter according to a second embodiment of the present invention. That is, this oil filter is constructed by housing a filter element 90 in a housing chamber 80 formed between a filter case (device main body) 60 and a filter head (device main body) 70. The filter case 60 has a case main body 60a having a cylindrical shape with an upper end surface opened, a funnel-shaped portion 60b continuous with a lower end portion of the case main body 60a and configured to gradually decrease in inner diameter downward, and a cylindrical discharge passage portion 60c extending downward from the center portion which is the lowest portion of the funnel-shaped portion 60b, and has a discharge hole 61 that communicates the inside and the outside of the filter case 60 at the center portion. A plug 20 is screwed into the discharge hole 61 via a female screw provided on an inner peripheral surface. The configuration of the plug 20 is the same as that of the first embodiment, the same reference numerals are given thereto, and a detailed description thereof will be omitted.

The filter head 70 is attached to the upper end portion of the case main body 60a of the filter case 60, and has an inflow passage 71 and a discharge passage 72. When the filter head 70 is attached to the filter case 60, the inflow passage 71 and the discharge passage 72 respectively extend from the inside of the housing chamber 80 along the axis of the filter case 60 and then bend to open on an outer peripheral surface of the filter head 70. The inflow passage 71 opens between the filter case 60 and an outer peripheral surface of the filter element 90 in the housing chamber 80, and the discharge passage 72 is provided so as to open in a center hole 91 of the filter element 90 in the housing chamber 80.

In this oil filter, when a pipeline on the upstream side in a hydraulic circuit is connected to the inflow passage 71 and a pipeline on the downstream side is connected to the discharge passage 72, an oil flowing into the housing chamber 80 through the inflow passage 71 passes through the filter element 90 from between the filter case 60 and the outer peripheral surface of the filter element 90, reaches the center hole 91, and is discharged from the discharge passage 72. During this time, the foreign matter contained in the oil cannot pass through the filter element 90 to be trapped, remains between the filter case 60 and the outer peripheral surface of the filter element 90, thereafter, gradually precipitates and is deposited on the one end surface 30a of a spacer member 30.

Therefore, also in this oil filter, if an imaging signal is given from an external device (not illustrated) to a unit control circuit 43 before the oil is circulated in the hydraulic circuit and image data having the imaging range of the one end surface 30a of the spacer member 30 is acquired by a solid state image sensor 41, it is possible to check the state of the oil without directly viewing the inside of the filter case 60.

Third Embodiment

Figure 7:
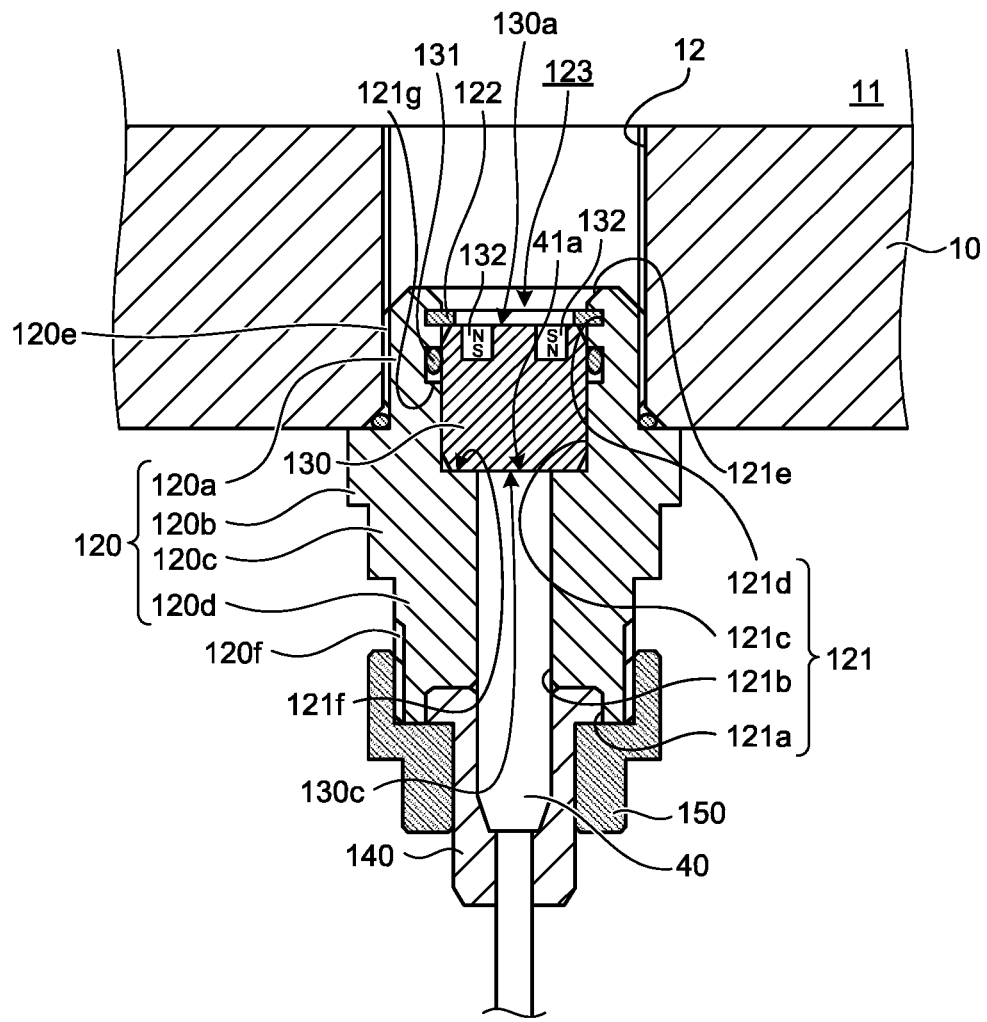
FIG. 7 is an enlarged cross-sectional view illustrating a main part of a hydraulic device according to a third embodiment of the present invention.
Figure 8:
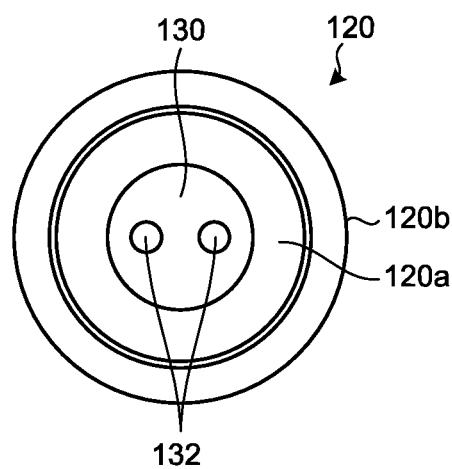
FIG. 8 is a plan view of a plug illustrated in FIG. 7.

FIG. 7 and FIG. 8 illustrate main parts of a hydraulic device according to a third embodiment of the present invention. Similar to the first embodiment, the hydraulic device exemplified here is a hydraulic pump for supplying oil to a hydraulic actuator (not illustrated) such as a hydraulic cylinder mounted on a construction machine, and only the configuration of the plug differs from that of the first embodiment. Hereinafter, the configuration of the plug will be described in detail, and the same reference numerals are given to the same configurations as those of the first embodiment, and a detailed description thereof will be omitted.

A plug 120 is a metal member in which a shaft portion 120a, a flange portion 120b, a head portion 120c, and a cap attaching portion 120d are sequentially provided from a tip end side. The shaft portion 120a has a male screw 120e on an outer peripheral surface and is a portion to be screwed into a discharge hole 12 of a device main body 10. The flange portion 120b is an annular portion having an outer diameter larger than an inner diameter of the discharge hole 12. The head portion 120c is a portion to which a tool is fitted when attaching and detaching the plug 120, and has a polygonal column shape such as a quadrangular or hexagonal cross section. The cap attaching portion 120d has a cylindrical shape with a smaller diameter than the head portion 120c and has a male screw 120f on the outer peripheral surface thereof.

The plug 120 is provided with an attachment hole 121 at a portion extending from a base end surface of the cap attaching portion 120d to a tip end surface of the shaft portion 120a. The attachment hole 121 includes a grommet fitting hole portion 121a opened in the base end surface of the cap attaching portion 120d, a first housing hole portion 121b having a smaller diameter than the grommet fitting hole portion 121a, a second housing hole portion 121c having an inner diameter larger than that of the first housing hole portion 121b, a ring attaching hole portion 121d having an inner diameter larger than that of the second housing hole portion 121c, and a tapered hole portion 121e formed such that a base end has an inner diameter smaller than that of the ring attaching hole portion 121d and an internal diameter gradually increases toward a tip end surface. Between the first housing hole portion 121b and the second housing hole portion 121c, due to a difference in the inner diametric dimensions of each other, an annular pressure receiving surface 121f facing the tip end side is constituted. The pressure receiving surface 121f of the plug 120 supports a hydraulic pressure applied through the spacer member 30.

In this attachment hole 121, a C ring 122 is attached to the ring attaching hole portion 121d, a spacer member 130 is housed in the second housing hole portion 121c, and an imaging unit 40 is housed in the first housing hole portion 121b. The C ring 122 is an annular member which is partly separated, and an inner circumferential side portion projects inward from an inner peripheral surface of the second housing hole portion 121c. Each of the spacer members 130 is a transparent cylindrical member having an outer diameter that can be fitted into the second housing hole portion 121c, and housed in the second housing hole portion 121c in a state where the axes of the spacer members 130 are aligned with each other, the C ring 122 is in contact with one end surface 130a, and the other end surface 130c is in contact with the pressure receiving surface 121f. The spacer member 130 made of glass or made of resin may be applied.

As is clear from figure, in the plug 120 housing the spacer member 130 in the second housing hole portion 121c, the one end surface 130a of the spacer member 130 is defined as an inner bottom surface by the tapered hole portion 121e provided at the base end portion, and a recessed portion 123 having a shape in which an inner diameter gradually increases toward the opening is formed. An O-ring 131 arranged in a seal groove 121g of the plug 120 is brought into pressure contact with each other between an outer peripheral surface of the spacer member 130 and an inner peripheral surface of the second housing hole portion 121c of the plug 120. In the spacer member 130 of the third embodiment, two magnet bodies 132 are arranged so as to face the outside from the one end surface 130a. The magnet body 132 is a columnar permanent magnet and is arranged so as to be displaced from each other by 180 degrees on the same circumference centered on the axis of the spacer member 130. In one of the magnet bodies 132, the end surface of the N pole is exposed to the outside and the other magnet body 132 is in a state where the end surface of the S pole is exposed to the outside. The end surfaces of the respective magnet bodies 132 are positioned on the same plane as the one end surface 130a of the spacer member 130.

When an imaging instruction is given from an external device (not illustrated), the imaging unit 40 acquires image data with the one end surface 130a of the spacer member 130 as an imaging range, and outputs the acquired image data to the external device (not illustrated). Although not explicitly illustrated in the figure, the imaging unit 40 applied in the third embodiment has the same configuration as that of the first embodiment. In the imaging unit 40, a grommet 140 is attached to a base end portion in a state where an imaging surface 41a of a solid state image sensor (not illustrated) is in contact with the other end surface 130c of the spacer member 130, and furthermore, a cap member 150 is screwed into the cap attaching portion 120d so as to be supported by the plug 120. The solid state image sensor (not illustrated) of the imaging unit 40 is adjusted in advance so that the one end surface 130a of the spacer member 130 is in a focal position when the imaging surface 41a comes into contact with the other end surface 130c of the spacer member 130. The image data acquired by the solid state image sensor (not illustrated) is preferably still image data, but it may be moving image data.

In the hydraulic pump constructed as described above, since the O-ring 131 is provided between the outer peripheral surface of the spacer member 130 and the inner peripheral surface of the second housing hole portion 121c of the plug 120, there is no possibility that the oil stored in the housing chamber 11 leaks to the outside through these gaps. When the plug 120 is removed from the discharge hole 12, it is possible to discharge the oil stored in the housing chamber 11 to the outside.

On the other hand, when an imaging signal is given from an external device (not illustrated) to the imaging unit 40 in a state where the plug 120 is screwed into the discharge hole 12, the solid state image sensor (not illustrated) acquires image data in which the one end surface 130a of the spacer member 130 is defined as the imaging range in a state where the light source (not illustrated) is turned on, and the acquired image data is transferred to the external device (not illustrated).

Here, the one end surface 130a of the spacer member 130 arranged in the plug 120 faces upward in the lowest part of the housing chamber 11 and is in a state of being in contact with stored oil. Therefore, when foreign matter such as abrasion powder is mixed in the oil, the foreign matter gradually precipitates due to the difference in specific gravity while the hydraulic pump is stopped, and is deposited on the one end surface 130a of the spacer member 130; therefore, the foreign matter is displayed on the image data acquired by the solid state image sensor (not illustrated). In particular, in the above-described plug 120, since the magnet body 132 is provided at one end portion of the spacer member 130, it is possible to maintain the state of adsorption of foreign matter made of a magnetic material such as iron powder and the state of contamination of foreign matter is more clearly displayed. In this case, in the third embodiment, magnetic lines of force are formed so as to couple the adjacent magnet bodies 132, in other words, the magnetic lines of force are formed along one end surface 130a of the spacer member 130; therefore, it is possible to more reliably confirm foreign matter made of a magnetic material.

That is, in the above-described hydraulic pump, if image data is acquired before starting, for example, by analyzing the acquired image data without directly visually checking the inside of the device main body 10, it is possible to accurately check the state of the oil stored in the device main body 10, so that it is possible to accurately determine the replacement time from the contamination state of the oil. Furthermore, since the image data is acquired by the solid state image sensor (not illustrated) provided in the plug 120, there is no need for an examiner to approve or look into the hydraulic pump every time; therefore, it is possible to easily check the state of oil regardless of the installation location of the hydraulic pump.

Furthermore, in the third embodiment, the other end surface 130c of the spacer member 130 is in a state of being in contact with the pressure receiving surface 121f of the plug 120. Therefore, even if a large hydraulic pressure acts on the housing chamber 11, hydraulic pressure acts only on the spacer member 130 contacting on the pressure receiving surface 121f, and there is no possibility of influence of oil pressure on the imaging unit 40. Therefore, the present embodiment can be applied to a hydraulic pump on which a higher hydraulic pressure acts.

Fourth Embodiment

Figure 9:
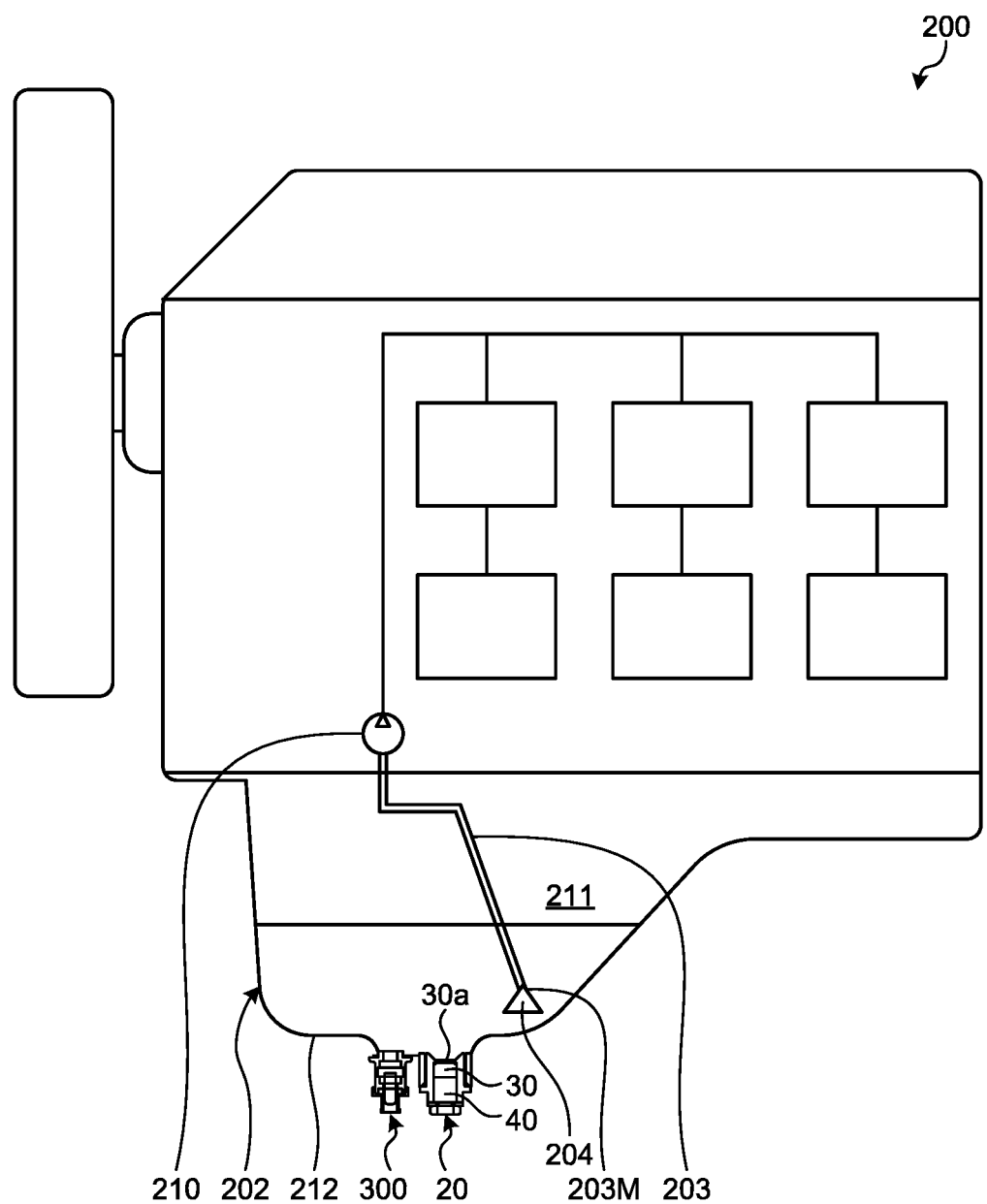
FIG. 9 is a schematic view of an engine according to a fourth embodiment of the present invention as seen from a side.

FIG. 9 illustrates a mechanical device according to a fourth embodiment of the present invention. In the fourth embodiment, an example in which the mechanical device includes an engine will be described. FIG. 9 is a schematic view of an engine 200 according to the fourth embodiment of the present invention as seen from a side.

The mechanical device has the engine 200 which is a device main body. The engine 200 is provided in a construction machine such as an excavator, a bulldozer, and a wheel loader.

The engine 200 has a housing chamber 211 in which oil is stored. The housing chamber 211 includes an internal space of an oil pan 202 provided at a lower portion of the engine 200. The housing chamber 211 of the oil pan 202 stores oil falling from a component of the engine 200.

A suction member 203 having a suction port 203M for sucking the oil in the housing chamber 211 is provided. The suction member 203 includes a tube having an internal flow passage through which oil can flow. The suction port 203M includes an opening provided at one end portion of the tube. In the present embodiment, an oil strainer 204 is disposed in the suction port 203M. The suction member 203 sucks the oil in the housing chamber 211 via the oil strainer 204.

An oil pump 210 is provided on the suction member 203. By operating the oil pump 210, the oil in the oil pan 202 is sucked from the suction port 203M. The oil sucked into the suction member 203 is supplied to the component of the engine 200.

The component of the engine 200 includes, for example, a rotating member such as a bearing, and a sliding member such as a gear or a piston. The oil supplied to the component of the engine 200 lubricates or cools the component. The oil supplied to the component of the engine 200 falls from the component and is stored in the housing chamber 211 of the oil pan 202.

As described above, in the present embodiment, by the operation of the oil pump 210, oil circulates in a circulation path including the housing chamber 211 of the oil pan 202 and the component of the engine 200.

The housing chamber 211 of the oil pan 202 has a bottom portion 212. The plug described in any one of the first to third embodiments is attached to the bottom portion 212. In this embodiment, the plug 20 described with reference to FIG. 2 is attached to the bottom portion 212. Note that the plug 20 described with reference to FIG. 5 may be attached to a bottom portion 210, or the plug 120 described with reference to FIGS. 7 and 8 may be attached to the bottom portion 210.

Figure 10:
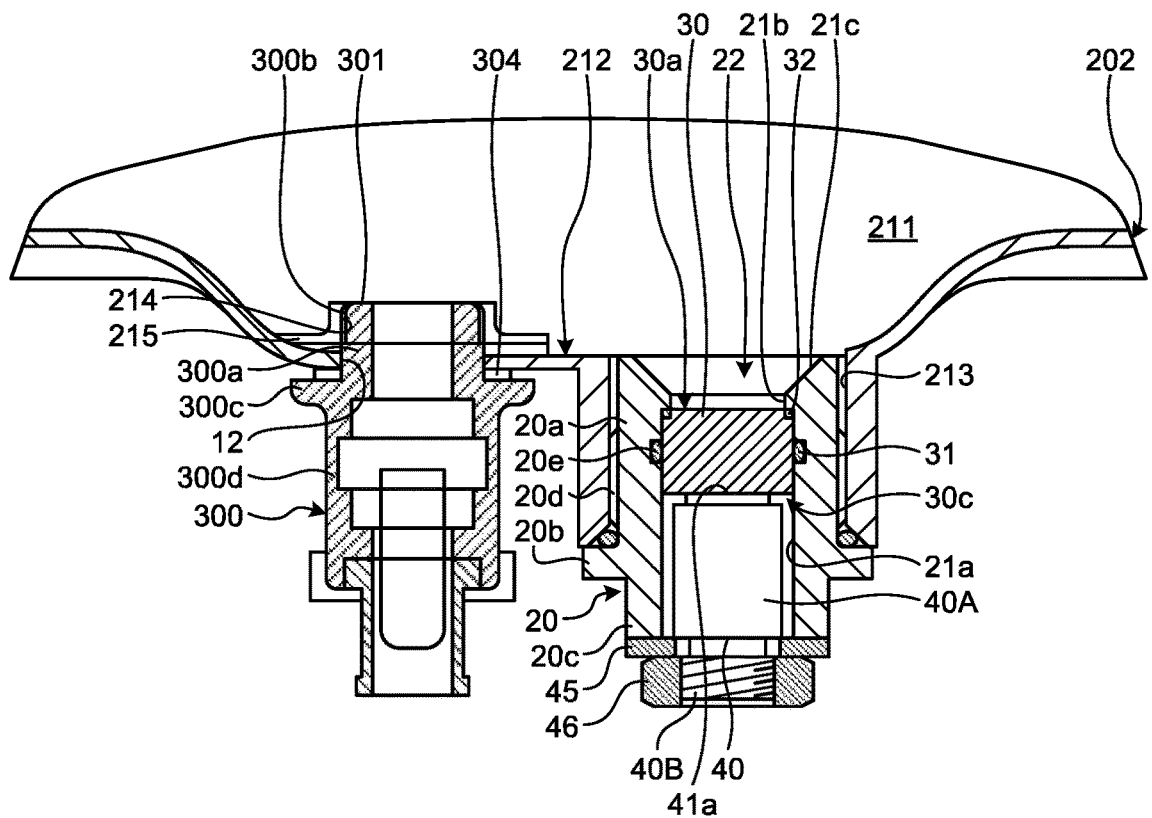
FIG. 10 is an enlarged cross-sectional view illustrating a main part of the engine illustrated in FIG. 9.
Figure 11:
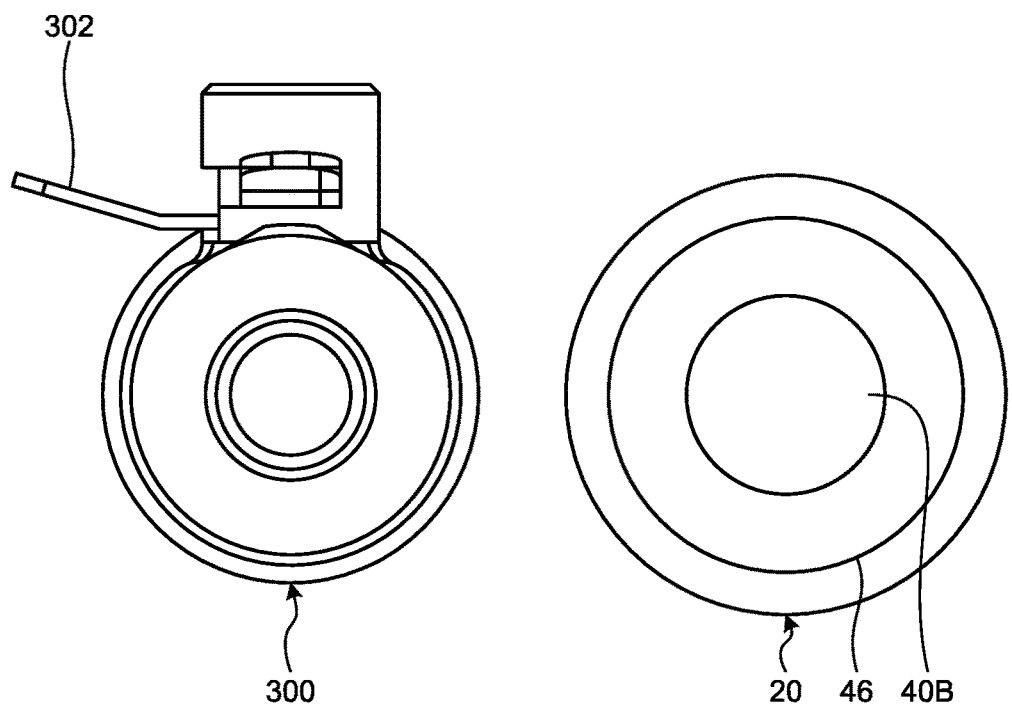
FIG. 11 is a schematic diagram of the engine according to a fourth embodiment of the present invention as viewed from below.

FIG. 10 is an enlarged cross-sectional view illustrating a main part of the engine 200 illustrated in FIG. 9. FIG. 11 is a schematic diagram of the engine 200 according to a fourth embodiment of the present invention as viewed from below. As illustrated in FIGS. 9, 10, and 11, the bottom portion 212 of the oil pan 202 is provided with a discharge hole 12 for discharging the oil stored in the housing chamber 211 to the outside. In the present embodiment, a plug 300 different from the plug 20 is disposed in the discharge hole 12. The plug 300 is detachably attached to the discharge hole 12.

The plug 300 has a shaft portion 300a, a male screw portion 300b provided on the shaft portion 300a, a flange portion 300c, and a head portion 300d. The shaft portion 300a has an upper end surface 301 facing the housing chamber 211.

A member 215 having a hole 214 in which a head portion 300a of the plug 300 is disposed is fixed to the bottom portion 212 of the oil pan 202 by welding. A female screw is provided on the inner peripheral surface of the hole 214. The male screw portion 300b of the plug 300 is screwed with a female screw provided on the inner peripheral surface of the hole 214. A seal member 304 is provided between the flange portion 300c and the oil pan 202.

The interior of the plug 300 has a ball valve structure, and by operating a lever 302, an internal flow passage of the plug 300 is opened, and the oil stored in the housing chamber 211 is discharged.

The bottom portion 212 of the oil pan 202 is provided with a hole 213 in which the plug 20 is disposed. A female screw is provided on the inner peripheral surface of the hole 213. The male screw 20d of the plug 20 is screwed with a female screw provided on the inner peripheral surface of the hole 213.

As in the first embodiment, a spacer member 30 is supported by the plug 20. The spacer member 30 has one end surface 30a. As illustrated in FIG. 9, in the present embodiment, the suction port 203M of the suction member 203 and the one end surface 30a of the spacer member 30 are disposed at different positions in a horizontal plane.

The one end surface 30a of the spacer member 30 is disposed at the lowermost portion of the bottom portion 212 of the oil pan 202. That is, the one end surface 30a of the spacer member 30 is disposed below the upper end surface 301 of the plug 300. The one end surface 30a of the spacer member 30 is disposed below the bottom portion 212 of the oil pan 202.

Foreign matter such as abrasion powder generated in the component of the engine 200 falls from the component to the oil pan 202 together with the oil. When foreign matter is mixed in the oil housed in the housing chamber 211 of the oil pan 202, the foreign matter is deposited on the one end surface 30a of the spacer member 30 disposed at the lowermost position in the bottom portion 212 of the oil pan 202 by the action of gravity.

In the present embodiment, the suction port 203M of the suction member 203 and the one end surface 30a of the spacer member 30 are disposed at different positions in a horizontal plane. Therefore, even if the oil pump 210 is operated and the suction operation from the suction port 203M is executed, it is suppressed that foreign matter deposited on the one end surface 30a of the spacer member 30 is attracted to the suction port 203M.

A solid state image sensor 41 of an imaging unit 40 can favorably acquire image data of foreign matter deposited on the one end surface 30a. Foreign matter information including at least one of the amount of foreign matter deposited on the one end surface 30a and the size of foreign matter can be collected from the image data of foreign matter. It is possible to estimate the degree of progress of wear of the component of the engine 200 or the state of deterioration of the component, for example, based on the foreign matter information. For example, when a large amount of foreign matter is deposited on one end surface 30a, it is estimated that a large amount of foreign matter is generated from the component of the engine 200 and the deterioration of the component is progressing. On the other hand, when there is a small amount of foreign matter deposited on one end surface 30a, it is estimated that a small amount of foreign matter is generated from the component of the engine 200, and the deterioration of the component has not progressed yet. When the deposit amount of foreign matter is large, it is determined that maintenance of the engine 200 is necessary, and when the deposit amount of foreign matter is small, it is determined that maintenance of the engine 200 is unnecessary. In this way, by monitoring the deposit state of foreign matter by the imaging unit 40, the end of life of the component of the engine 200 can be accurately grasped, so that maintenance of the engine 200 can be performed at an appropriate timing just before the end of the life of the component.

Furthermore, in the present embodiment, as a detection device that detects foreign matter, the imaging unit 40 that acquires image data of a foreign object is adopted. Therefore, it is possible to grasp not only the amount of foreign matter but also the size of each foreign matter based on the image data acquired by the imaging unit 40. Therefore, it is possible to precisely estimate not only the time of maintenance of the engine 200 but also the state of the component of the engine 200 (uneven wear state, broken state).

In the above-described embodiments, a male screw portion is provided on a shaft portion of a plug so as to be screwed directly to a device main body, but the plug may be screwed to the device main body via the flange portion.

REFERENCE SIGNS LIST

10 DEVICE MAIN BODY
11 HOUSING CHAMBER
12 DISCHARGE HOLE
20 PLUG
20a SHAFT PORTION
20b FLANGE PORTION
20c HEAD PORTION
20d MALE SCREW
20e SEAL GROOVE
21 ATTACHMENT HOLE
21a HOUSING HOLE PORTION
21b SMALL DIAMETER HOLE PORTION
21c TAPERED HOLE PORTION
22 RECESSED PORTION
30 SPACER MEMBER
30a ONE END SURFACE
30b SCALE MARK
30c OTHER END SURFACE
31 O-RING
32 MAGNET BODY
40 IMAGING UNIT
40A UNIT CASE
40B MALE SCREW PORTION
41 SOLID STATE IMAGE SENSOR
41a IMAGING SURFACE
42 LIGHT SOURCE
43 UNIT CONTROL CIRCUIT
44 TRANSMISSION/RECEPTION CIRCUIT
60 FILTER CASE (DEVICE MAIN BODY)
60a CASE MAIN BODY
60b FUNNEL-SHAPED PORTION
60c DISCHARGE PASSAGE PORTION
61 DISCHARGE HOLE
70 FILTER HEAD (DEVICE MAIN BODY)
71 INFLOW PASSAGE
72 DISCHARGE PASSAGE
80 HOUSING CHAMBER
90 FILTER ELEMENT
91 CENTER HOLE
120 PLUG
120a SHAFT PORTION
120b FLANGE PORTION
120c HEAD PORTION
120d CAP ATTACHING PORTION
120e MALE SCREW
120f MALE SCREW
121 ATTACHMENT HOLE
121a GROMMET FITTING HOLE PORTION
121b FIRST HOUSING HOLE PORTION
121c SECOND HOUSING HOLE PORTION
121d RING ATTACHING HOLE PORTION

121e TAPERED HOLE PORTION
121f PRESSURE RECEIVING SURFACE
121g SEAL GROOVE
122 C RING
123 RECESSED PORTION
130 SPACER MEMBER
130a ONE END SURFACE
130c OTHER END SURFACE
131 O-RING
132 MAGNET BODY
200 ENGINE (MECHANICAL DEVICE)
202 OIL PAN
203 SUCTION MEMBER
203M SUCTION PORT
204 OIL STRAINER
211 HOUSING CHAMBER
212 BOTTOM PORTION
213 HOLE
214 HOLE
215 MEMBER
300 PLUG
300a SHAFT PORTION
300b MALE SCREW PORTION
300c FLANGE PORTION
300d HEAD PORTION
301 UPPER END SURFACE
302 LEVER
304 SEALING MEMBER.

The invention claimed is:

1. A mechanical device comprising:
a device main body having a housing chamber in which oil is stored;
a plug attached to a bottom portion of the housing chamber in a state where an end of a shaft portion faces upward;
a spacer member formed by a transparent member and arranged on the plug in such a manner that one end faces an inside of the housing chamber;
at least one magnet body arranged on one end portion of the spacer member; and
an image sensor arranged on the plug, the image sensor imaging the inside of the housing chamber via the spacer member, wherein
the at least one magnet body is configured to maintain the state of adsorption of foreign matter made of a magnetic material, and
the image sensor is configured to acquire the image data on which the foreign matter is displayed, via the spacer member.

2. The mechanical device according to claim 1, wherein the other end of the spacer member is disposed inside the plug.

3. The mechanical device according to claim 1, wherein the one end of the spacer member is disposed inside the plug.

4. The mechanical device according to claim 1, wherein the image sensor is supported by the plug.

5. The mechanical device according to claim 1, comprising a recessed portion formed in the plug, wherein
an inner bottom of the recessed portion includes the one end of the spacer member.

6. The mechanical device according to claim 5, wherein the recessed portion is tapered such that an inner diameter gradually increases as the recessed portion separates from the one end of the spacer member.

7. The mechanical device according to claim 5, comprising a magnet body arranged on an inner peripheral of the recessed portion excluding the one end of the spacer member.

8. The mechanical device according to claim 5, comprising a magnet body arranged on the one end of the spacer member.

9. The mechanical device according to claim 1, wherein the plug has a pressure receiving that supports hydraulic pressure applied via the spacer member.

10. The mechanical device according to claim 1, wherein the device main body includes an engine provided in a construction machine, and
the housing chamber stores oil falling from a component of the engine.

11. The mechanical device according to claim 10, comprising a suction member having a suction port that sucks the oil of the housing chamber, wherein
the suction port and the one end of the spacer member are disposed at different positions in a horizontal plane.

12. The mechanical device according to claim 1, wherein the one end of the spacer member is disposed at a lowermost portion of the bottom portion.

13. The mechanical device according to claim 1, comprising a discharge hole that discharges oil stored in the housing chamber to an outside, the discharge hole being provided at the bottom portion of the housing chamber, wherein the plug is detachably attached to the discharge hole.

* * * * *